United States Patent Office 3,538,681
Patented Nov. 10, 1970

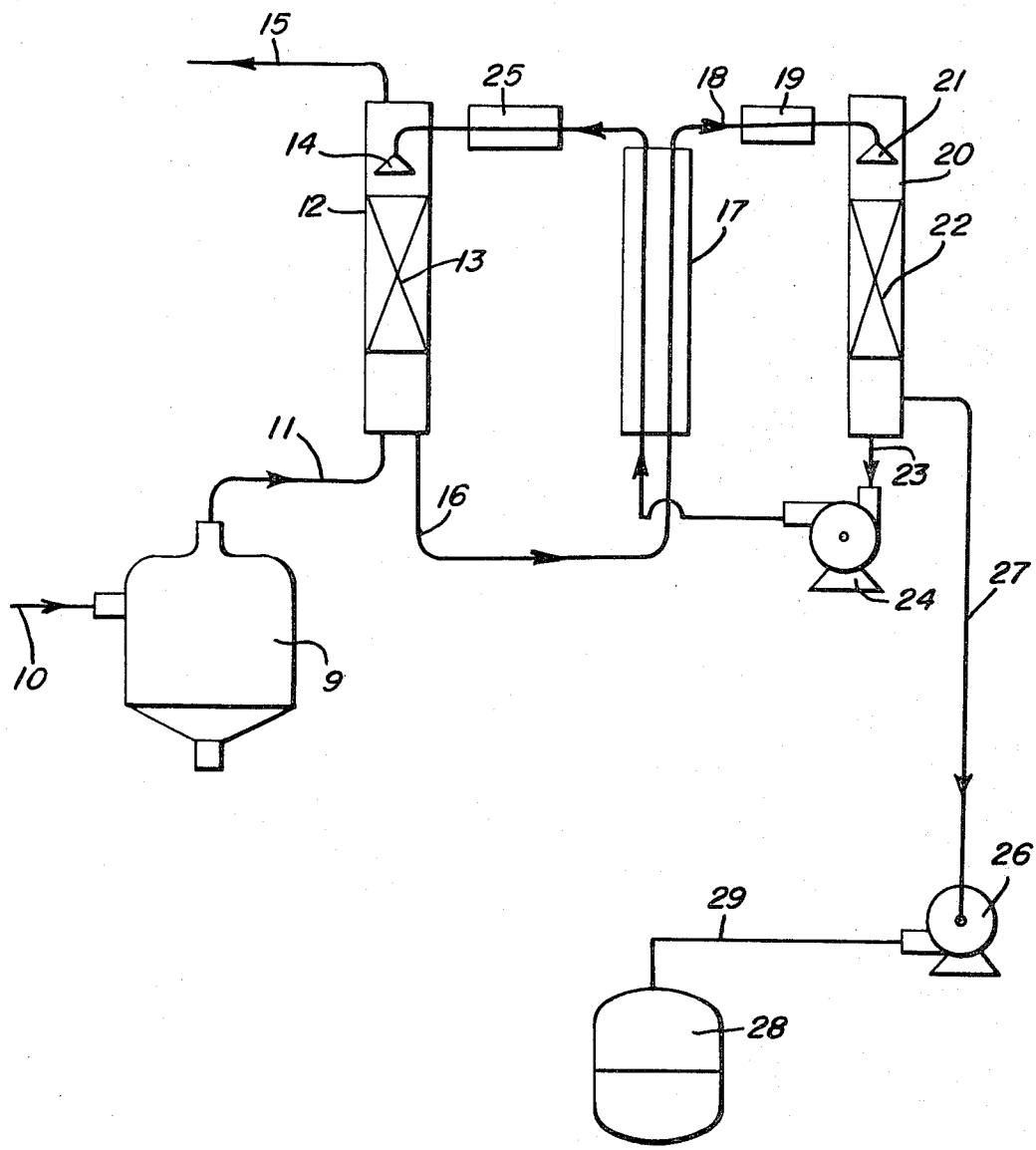

3,538,681
RECOVERY OF SO$_2$
Robert R. Cantrell, Memphis, Tenn., and Forrest P. Wiley, Washington, D.C., assignors to W. R. Grace & Co., New York, N.Y., a corporation of Connecticut
Filed Dec. 5, 1968, Ser. No. 781,464
Int. Cl. B01d 19/00
U.S. Cl. 55—48                        6 Claims

ABSTRACT OF THE DISCLOSURE

A method for removing and recovering SO$_2$ from gaseous mixtures such as power plant flue gases by absorbing the SO$_2$ in dimethyl sulfoxide (DMSO), and subsequently desorbing the SO$_2$ from the DMSO/SO$_2$ mixture by contacting the mixture with alumina, or other suitable adsorbent.

---

This invention is concerned with the removal of sulfur dioxide from streams of mixed gases. Its value lies in the effectiveness with which the process removes SO$_2$ from gas streams even when the SO$_2$ forms but a very small percentage of the total gas flow. In consequence the process has special usefulness in scavenging sulfur dioxide from flue gas.

The destructive effects of sulfur dioxide when it is an atmospheric contaminant are too well known to need elaboration. Suffice it to say that its deleterious effects are so serious that burning fuels containing significant amounts of sulfur is forbidden by numerous ordinances and environmental control agency orders. In the past, scavenging the sulfur dioxide from the flue gas has met major difficulties because the exit gases from the boilers rarely contain more than 2000 parts of SO$_2$ to 1 million parts by volume of hot flue gas which is released by a power station has been difficult, expensive, and indifferently successful. As a result, expensive fuels are burned wherever the likelihood of damage from released sulfur dioxide is high. Should the flue gas issuing from a power station stack contain 0.7% of SO$_2$, a power station of ordinary capacity will pour 25 lbs. of SO$_2$ gas per minute into the atmosphere. In many locations this is intolerable, and is prohibited.

The present invention has the potentiality for removing at least 99% of the SO$_2$ from the flue gas. Consequently it is now possible to burn sulfur-containing fuels (which are considerably cheaper) and yet release into the atmosphere stack gases containing nearly undetectable amounts of sulfur dioxide.

It is therefore an object of the present invention to provide an improved method for removing sulphur dioxide from mixed gas streams.

It is still a further object to provide the means for recovering substantial quantities of sulfur as sulfur dioxide.

These and additional objects will become readily apparent to one skilled in the art from the following detailed description and drawing wherein the figure represents a schematic diagram of a system suitable for conducting the presently disclosed method.

Broadly, the present invention comprises a method for removing sulfur dioxide from mixed gas streams wherein dimethyl sulfoxide is used as a selective absorbent for SO$_2$ and the dimethyl sulfoxide is subsequently regenerated by contact with activated alumina.

More specifically, it is found that small quantities of sulfur dioxide may be rapidly and efficiently removed and recovered from mixed gas streams by a process which comprises the following essential steps:

(1) Contacting the sulfur dioxide containing gas mixture with dimethyl sulfoxide in a sulfur dioxide absorbing zone to selectively absorb the sulfur dioxide from the gas stream and to obtain a sulfur dioxide-dimethyl sulfoxide mixture.

(2) Regenerating the dimethyl sulfoxide by treating the dimethyl sulfoxide-sulfur dioxide mixture in a sulfur dioxide desorbing zone wherein the mixture is contacted with activated alumina or other suitable solid adsorbent and the sulfur dioxide is selectively desorbed from the dimethyl sulfoxide, and (3) Preferably recirculating the regenerated dimethyl sulfoxide to the sulfur dioxide adsorbing zone.

In a particularly preferred practice of the present invention the regeneration of the dimethyl sulfoxide is conducted in a sulfur dioxide desorbing zone which is maintained under partial vacuum. Under these conditions it is found that the absorbed sulfur dioxide may be continuously desorbed from the dimethyl sulfoxide and recovered on a continuous bases.

Mixed gas streams which contain sulfur dioxide which may be treated in accordance with the practice of the present invention typically comprise industrial flue or stack gases which are obtained from the combustion of coal, oil or natural gas fuels. These fuel gases contain anywhere from about 500 to about 10,000 p.p.m. SO$_2$ and in addition contain varying amounts of fly ash, carbon dioxide, water, vapor, inert gases, and incomplete combustion products of carbon. Flue gases merging from a typical combustion device possess an initial temperature of 150° C. Prior to being subjected to the absorption process contemplated herein flue gas is preferably cooled and pretreated to remove most of the solid material therefrom.

Typically, flue gas is passed through standard precipitators which may utilize mechanical and water scrubbing procedures. Flue gas, as it is conducted to the present absorption process, preferably contains no solid material and will possess a temperature of from about 24 to about 40° C.

The absorption of the SO$_2$ from the mixed gas stream is conducted in a typical countercurrent gas liquid contact column. Preferably, the column is packed so as to provide a considerable surface area for absorption to occur. In a typical procedure dimethyl sulfoxide is fed into the top of a vertical column. In such an arrangement treated stack gas will be continuously recovered from the top of the column and sulfur dioxide containing dimethyl sulfoxide will be recovered from the bottom. Generally from about 0.5 to about 1.0 weight unit of flue gas are contacted per weight unit of liquid dimethyl sulfoxide. The absorption process is preferably conducted at a temperature of from about 24° C. to about 34° C. and under atmospheric pressure conditions.

The regeneration of the dimethyl sulfoxide is conducted in a desorbing zone wherein the SO$_2$ laden dimethyl sulfoxide which contains from about 1 to about 2% by weight SO$_2$ dissolved therein is contacted with an activated alumina. The alumina used in the practice of the present invention is readily available from commercial sources and may be defined as a gamma type alumina which possesses a surface area of from about 150 to 400 square meters per gram and preferably a pore volume of from about 0.25 to 0.40 and white as activated by heating at a temperature of about 1000° F. The alumina absorbent is normally utilized in a particulate form which possesses the particle size of from about 0.59 to 2.0 mm. while the prepared absorbent is aluminum. It is also contemplated that silica or silica-aluminum absorbents having the desired surface characteristics may also be used.

The desorption of the SO$_2$ from the dimethyl sulfoxide is conducted at a temperature of from about 40° C. to about 90° C. and may be conducted at atmospheric pressure or slightly above, but preferably under sub-atmospheric conditions. When the desorption process is carried out under atmospheric or super-atmospheric conditions, the $SO_2$ is absorbed by the alumina until the alumina reaches its absorption capacity. Subsequently, the alumina is subjected to a desorption cycle wherein the pressure is reduced to about 60 to 660 mm. of mercury (absolute) and desorption of the $SO_2$ occurs.

In an alternative and preferred embodiment or practice of the present invention, the regeneration of the dimethyl sulfoxide is conducted in a desorption zone which is maintained under a partial vacuum of from about 100 to 700 mm. of mercury. It is found that when the dimethyl sulfoxide is regenerated under these conditions, the sulfur dioxide component, which is removed from the dimethyl sulfoxide, is apparently absorbed by the activated alumina and simultaneously desorbed from the activated alumina in gaseous form. Thus, it is seen that by using a partial vacuum during the regeneration of the dimethyl sulfoxide component, $SO_2$ may be simultaneously and continuously removed from the process, thereby eliminating the need for a separate alumina regeneration cycle. When vacuum is used during the regeneration of the DMSO, a temperature below which the dimethyl sulfoxide exhibits substantial vapor pressure is used. Normally temperatures on the order of from about 40 to about 90° C. and pressures on the order of from about 60 to about 660 mm. mercury are most satisfactory.

The $SO_2$ which is desorbed from the dimethyl sulfoxide is collected as a gas, and may be subsequently compressed and stored as a liquid. It is found that when the present invention is practiced on a relatively large scale, large quantities of $SO_2$ are recovered which possess considerable commercial value.

Referring to the dawing it is seen that flue gas enters the wet scrubber, 9 through conduit 10, and passes along the line, 11, to the sorption column, 12, where the gas passes upwardly through a packing such as Berl saddles, 13. The gas is met by a downward flow of DMSO projected into the column 12 through the distributing nozzle, 14. Scrubbed flue gas leaves column 12 through conduit 15 and is vented to the atmosphere. Liquid DMSO containing the sulfur dioxide washed out of the flue gas exits from the column 12 through line 16, and passes through heat exchanger, 17. The solution leaves the heat exchanger 17 through conduit 18 and may receive supplemental heating in heat exchanger 19, then passes by way of distributing nozzle 21 into a desorption column, 20, where the DMSO/$SO_2$ solution passes downwardly through a packing, 22, of activated alumina. In the column, 20, which is preferably operated under vacuum, the sulfur dioxide is removed from its solvent DMSO and is adsorbed in the solid phase activated alumina. The DMSO falls to the bottom of column, 20, exits through line 23 and returns to the sorption column, 12, after passing through a pump, 24, and the heat exchanger, 17. Supplemental cooling may be necessary, and is supplied in the cooler, 25. The $SO_2$ gas which is released continuously from the alumina when column 20 is under vacuum, is drawn into a compressor, 26 through conduit 27, the gas is compressed to approximately 55 p.s.i., and is delivered as a liquid to $SO_2$ tank, 28 through line 29.

Assuming that the total gas flow from the boilers of a porous station is 3170 lbs. of gas/minute, that the water-scrubbed flue gas temperature is 86° F., and that the gas contains approximately 0.7% of sulfur dioxide, a flow of 5978 lbs. of DMSO/minute through the sorption apparatus will pick up 22½ lbs. of sulfur dioxide.

Exact values and efficiencies are, of course, dependent on the specific recovery system. Generally however, DMSO temperature as it enters the sorption tower should be about 30° C. ±5° C. for, in this range, viscosity is favorable for pumped operation, yet the vapor pressure is reasonably low. The weight of DMSO which should be brought into contact with a given weight of flue gas to achieve a 99% $SO_2$ recovery depends on absorber construction, the efficiency of the packing in developing extended surface area, and to a certain extent on the composition of the combustion effluent. Nevertheless, a ratio of DMSO pumped to pounds of flue gas passing into the sorption tower which will permit 99% $SO_2$ removal will be found. Its value usually lies between equal weights of DMSO and flue gas, and 2 weight units DMSO to 1 weight flue gas DMSO×2/flue gas 1.

The following specific examples further illustrate the working of the present invention:

EXAMPLE I

A gas stream composed of nitrogen gas saturated with water vapor and contaminated with 2000 parts/million of $SO_2$ gas was washed countercurrently with dimethylsulfoxide at 30° C. in an 18 x 1-inch column which was packed with ¼ inch Berl saddles. The DMSO/$SO_2$ solution which resulted was heated to 60° C. and passed through a 15 x 1¼-inch column, packed with activated alumina. The unit was operated for approximately 25 hours during which the initial conditions were maintained continuously. Sampling at various times showed that 99% of the $SO_2$ gas in the initial mixture was removed from the gas stream. At approximately 25 hours, the amount of $SO_2$ found in the effluent gas began to rise slowly. At this time the charge of activated alumina, now replete with sulfur dioxide, was removed from the tube. Replacement of the charge of activated alumina in the desorber tube returned the $SO_2$ emission in the effluent to undetectable levels.

EXAMPLE II

The conditions of Example I were followed, with the exception that the desorption column was arranged as shown in the figure to operate at 260 mm. Hg (absolute). Desorption of the $SO_2$ from the alumina was continuous. The desorption column operated continuously without loss of absorption capacity for 55 hours.

What is claimed is:
1. A process for removing sulfur dioxide gas from a stream of mixed gases which comprises:
   (a) contacting a gas stream containing sulfur dioxide with liquid dimethyl sulfoxide to selectively absorb the sulfur dioxide from said gas stream, and to obtain a dimethyl sulfoxide-sulfur dioxide mixture, and
   (b) desorbing said sulfur dioxide from the dimethyl sulfoxide-sulfur dioxide mixture by contacting said mixture with activated alumina.
2. The process of claim 1 wherein the dimethyl sulfoxide of step (b) is recycled to step (a) while simultaneously the desorbed sulfur dioxide is being collected.
3. The process of claim 1 wherein water scrubbed flue gas is contacted with one volume of dimethyl sulfoxide per about 700 to about 1100 volumes of gas.
4. The process of claim 1 wherein said contacting of mixed gases with dimethyl sulfoxide is conducted at a temperature of from about 20 to 40° C.
5. The method of claim 1 wherein said desorbing step (b) is conducted under a partial vacuum of from about 100 to 700 mm. mercury at a temperature of from about 40 to 90° C.
6. The method of claim 2 wherein said sulfur dioxide is collected from said desorbing zone under reduced pressure, and the collected sulfur dioxide is compressed under pressure of from about 3.7 to about 4.0 atmospheres.

References Cited

UNITED STATES PATENTS 3,405,508   10/1968   Peters et al. _____ 55—73
3,475,329   10/1969   Little et al. _____ 55—73 X SAMIH N. ZAHARNA, Primary Examiner
R. W. BURKS, Assistant Examiner U.S. Cl. X.R.
23—2, 178; 55—55